Nov. 8, 1949 — DE WITT McCANN — 2,487,660
YIELDING VEHICLE STEP
Filed Aug. 24, 1946 — 3 Sheets-Sheet 1
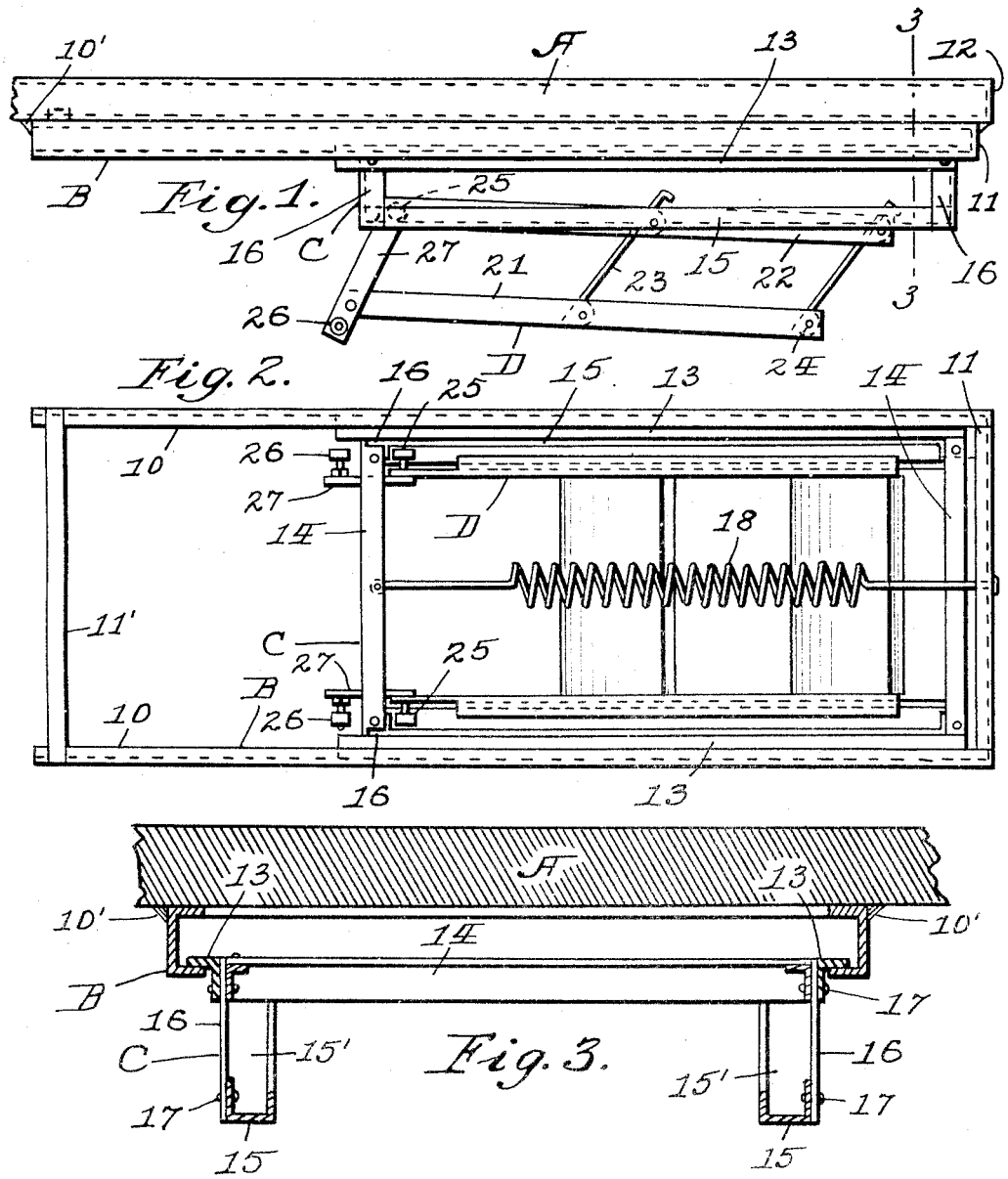

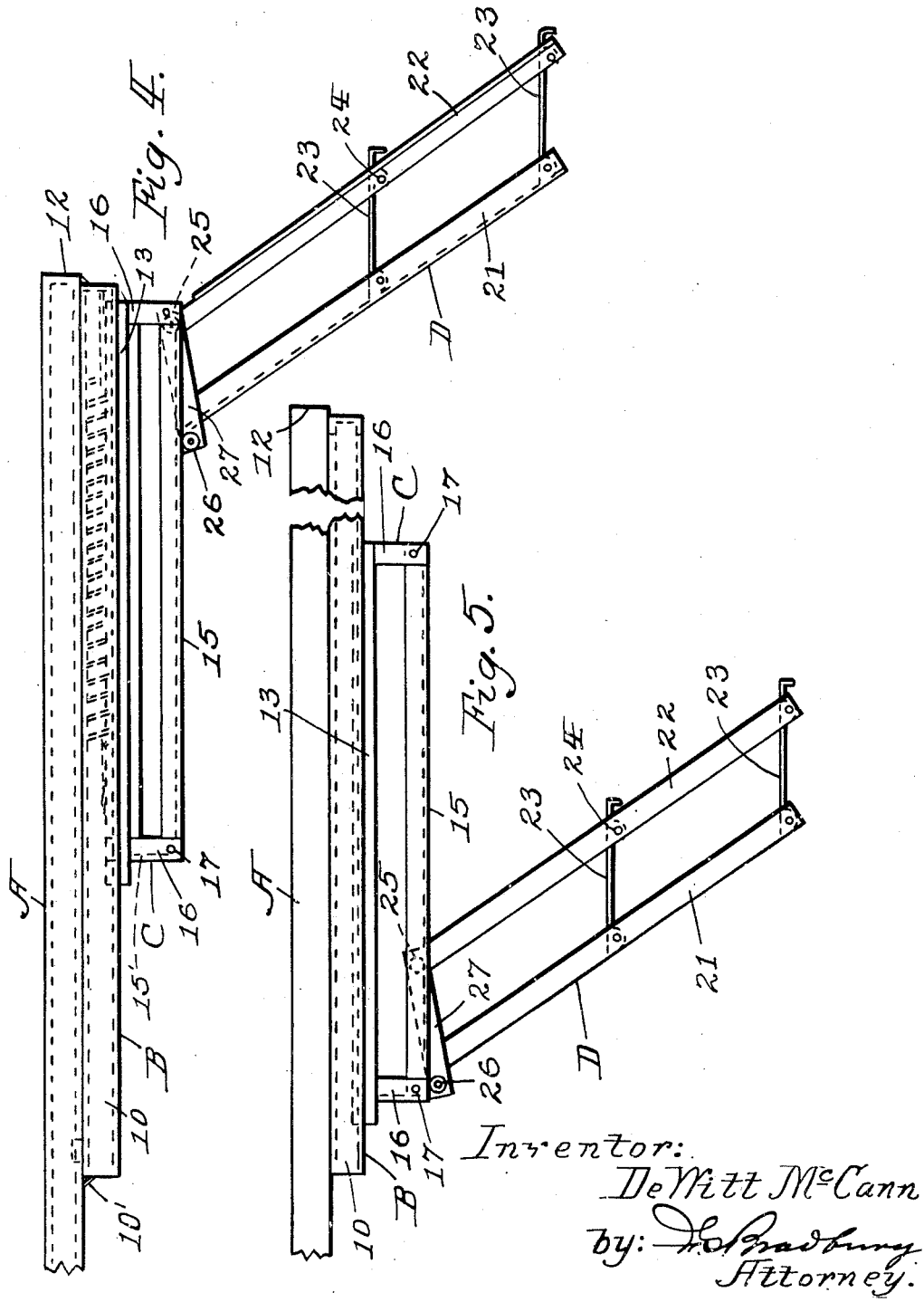

Nov. 8, 1949 DE WITT McCANN 2,487,660
YIELDING VEHICLE STEP
Filed Aug. 24, 1946 3 Sheets-Sheet 3
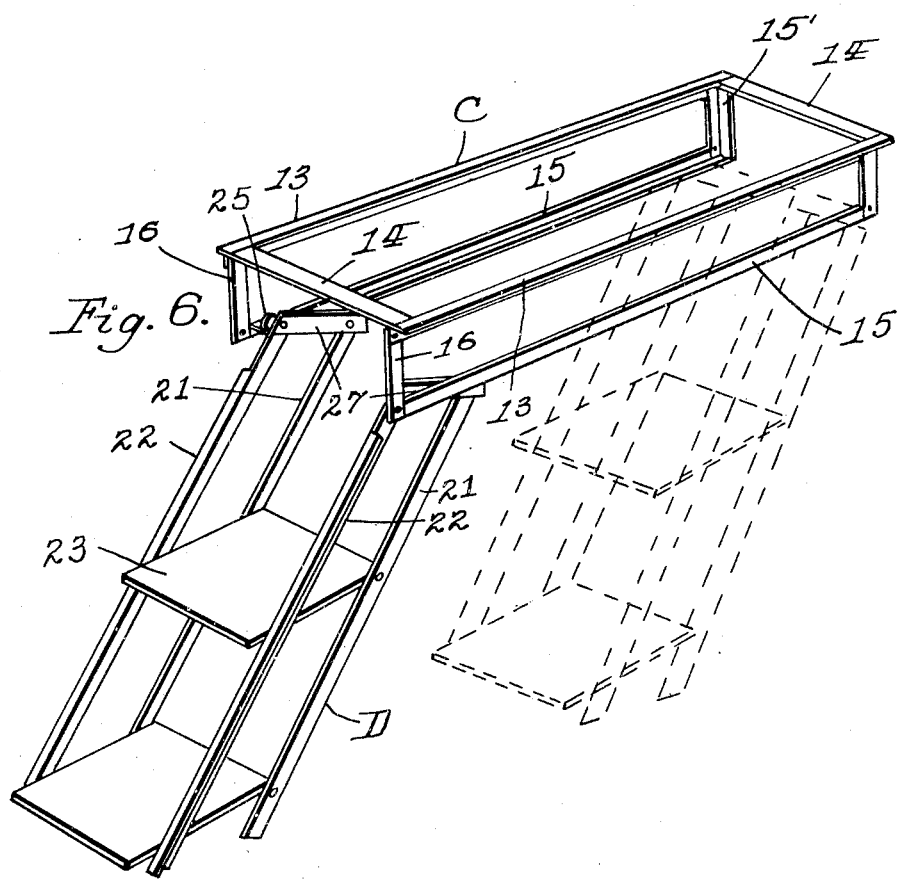
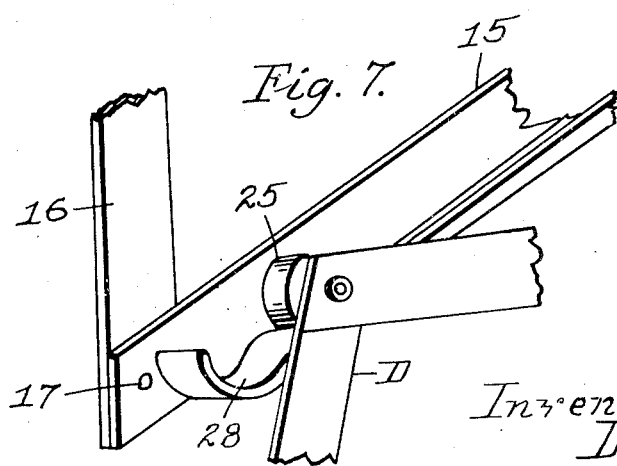
Inventor:
DeWitt McCann
by: F. L. Bradbury
Attorney.

Patented Nov. 8. 1949

2,487,660

UNITED STATES PATENT OFFICE 2,487,660

YIELDING VEHICLE STEP

De Witt McCann, Los Angeles, Calif.

Application August 24, 1946, Serial No. 692,861

1 Claim. (Cl. 280—167)

This invention relates to an automatic recedable step device for vehicles, such as trucks and other types of automobiles used for various purposes, wherein the step is extendable and foldable and tends automatically to remain in operative or inoperative positions.

More particularly my improvement is directed to means by which the step when extended into operative position beyond one end or side of the body of the vehicle will yield automatically and recede into safe retracted position if the outer portion of the step structure accidentally contacts an obstruction of any sort, such as a curb, side of a building, another vehicle, and the like. For instance, when the step is unfolded into operative position, if the vehicle upon which the step structure is mounted and used causes the step to strike a street curb or other object, the step will thereupon yield and recede automatically, thereby avoiding damage to the step structure. Folding steps heretofore provided on vehicles have frequently been broken or damaged by the vehicle being driven and the step structure forced against an obstruction while the step is in operative position. This objection is entirely overcome and avoided by the use of my improvement.

Among the objects of my improved step is the production of a device of its kind which is compact, simple in construction, and highly effective in use. To these ends this invention comprises the features of construction and combination of parts hereinafter described and claimed.

In the accompanying drawings forming part of this specification, Fig. 1 is a side elevational view, showing my improved step structure normally collapsed or folded in its yielding support; Fig. 2 is a plan looking down upon the structure shown in Fig. 1, when removed from the floor such for illustration as A of a vehicle upon which the device is mounted when in use; Fig. 3 is a cross section on the line 3—3 of Fig. 1, at an enlarged scale; Fig. 4 is a view similar to Fig. 1 when the step is unfolded in readiness for use; Fig. 5 is a view similar to Fig. 4 (portions broken away), showing the step structure and its yielding support in freely receded position which it may assume if accidentally struck by an obstruction or object; Fig. 6 is a perspective view of the step and its yielding support showing the former in forward unfolded position in said support ready for use, and the broken line position indicating a receded position the step is free to assume in case the step is accidentally struck; and Fig. 7 is a detail in perspective illustrating a portion of the means by which the step is supported on the step carrier frame or carriage.

In the drawings A represents a portion of the floor of a vehicle body of any suitable construction and which may represent the rear end or side portion thereof. To the bottom surface of said floor is rigidly secured by welding at 10' or by bolting, riveting or other suitable means a channel rectangular supporting frame B having a pair of parallel longitudinal inwardly opening channel side rails 10 and transverse end members 11 and 11'. The supporting frame terminates longitudinally at its forward end in proximity to the outer edge portion 12 of the floor of the vehicle which may represent the rear end or side edge of a truck or other vehicle.

Arranged to slide freely and longitudinally forwardly and backwardly in the stationary supporting frame B is a yielding step supporting carriage C, and movably mounted to function in the manner hereinafter described on the carriage is a folding and automatically yielding step structure D.

The carriage C has a pair of upper longitudinal side supporting rails 13, the upper outturned sides of which ride upon the lower inturned flanges of the longitudinal channel members 10, thus coinciding to produce a free sliding support for the carriage on the stationary supporting frame. The rails are braced and held in parallel position apart by the transverse end bars 14. The carriage frame which is composed of the supporting rails 13 and cross members 14 supports a parallel pair of lower longitudinal track rails 15 by the short hanger arms 16. These hanger arms are secured at their opposite ends to the rails 13 and 15 by riveting at 17 or other suitable means. The track rails 15 resemble upturned channels which are secured on the inner faces of the hangers 16 (Fig. 3).

Free reciprocable movement of the carriage is afforded substantially throughout the entire length of the stationary supporting frame B, the forward movement of the carriage being limited by the forward transverse end member 11 (Fig. 2). The carriage is normally and yieldingly held in forward position adjacent to the outer end portion of the stationary supporting frame B by the contractible helical spring 18. The opposite ends of this spring are secured to the forward end member 11 of the stationary frame B and the rearward end member 14 of the carriage (Fig. 2). In this manner the carriage C is free to be pushed inwardly in the supporting frame B by the step structure D as will be hereinafter described.

The step structure has a pair of ladder side rail members, each of which is composed of a pair of spaced longitudinal rails 21 and 22. Step treads 23 are placed at suitable intervals in elevation apart across the space between said side members and are secured to said rails by rivets 24 or other suitable means. The step structure D or what I have chosen to also term the "step" or "step ladder" is movably mounted on the carriage by two pairs of freely revoluble bearing rollers 25 and 26 at the upper end portion of each side member of the step structure. A diagonally disposed brace 27 is secured by riveting or other suitable means to the upper end portions of each pair of the step structure rails and the members of the bearing rollers are freely journaled on the opposite ends of said brace. The diagonal slant of the brace 27 is sufficient so that one roller 25 of a pair engages downwardly in the channel in the upper side of one of the track rails 15 while the companion roller 26 engages upwardly in contact against the lower side. This feature is duplicated in connection with both pairs of the ladder side rails. The step structure is thus fulcrumed by the pair of rollers 25, and the rollers 26 in cooperation with the fulcrum rollers serve to engage the lower sides of the track rails 15 and support the step structure in outwardly and downwardly slanting operative position on the carriage as shown in Figs. 4 and 6. In this position as shown in Fig. 4 the forward pair of bearing rollers 25 acting as fulcrums releasably engage in cups 28 (Fig. 7), which are formed in the forward end portions of the track rails 15. These cups also act as stops to limit the forward movement of the ladder in operative position extending forwardly beyond the edge 12 of the body member A of the vehicle. In this forward position a person is enabled to mount the vehicle by the use of the step ladder or structure.

To collapse and fold the step structure into inoperative position in the carriage as shown in Fig. 1, the forward lower end of the step structure is raised into substantially horizontal position and then forced fully into the carriage below the body A of the vehicle. In urging the step structure into raised collapsed position the bearing rollers 25 are forced out of the cups 28 and roll inwardly freely along the channels or runways in the track rails 15. Also the outer flanges on the side rails 22 of the step structure engage and slide along said runways in and are supported by the track rails. In this manner the step structure is adapted to be retained in concealed position below the body A of the vehicle. The inward horizontal sliding movement in the carriage by the step structure is lmiited by stops 15' at the inner ends of the track rails 15 (Figs. 3 and 6).

When the step structure is in operative or unfolded position as shown in Figs. 4 and 6, and if an object or obstruction strikes or presses against the lower outer end portion thereof the supporting rollers 25 are first caused to disengage from the cups 28 and the step structure is retracted inwardly while still remaining in forward downwardly slanting position, along the track rails 15 into the position shown in full lines in Fig. 5, and in broken lines in Fig. 6. This freely yielding feature safeguards the step against damage which otherwise would occur.

In the event continued pressure is urged against the lower forward end portion of the step structure such as might occur accidentally, the step structure including the carriage on which it is supported is slid further inwardly below the vehicle body along the channels of the side rails 10 of the supporting frame B while the step structure remains in forwardly slanting position. In this manner the inward safety movement yieldingly permitted freely by the entire structure is increased or multiplied, thus guarding against damage to any portion of the apparatus. The spring 18 serves to return and tends to retain the carriage in its forward position with its outer end in proximity to the outward edge portion 12 of the vehicle body.

The yielding means provided by my improvement also enables the step structure when in folded position as shown in Fig. 1, to freely slide inwardly by the carriage against the tension of the spring 18, thus additionally safeguarding the step structure from being damaged.

Various changes from the construction herein described may be made without departing from the spirit of the invention as embraced within the scope of the following claim.

I claim:

A device of the class described which is automatically recedable below the surface of a vehicle body when striking or being struck by an object, comprising a pair of substantially parallel and horizontally disposed rails on the lower surface of said body, said rails having end portions thereof extending outwardly below an edge portion of said body and outwardly disposed stop means thereon, a carriage slidable longitudinally on said rails adapted to assume outwardly extended position limited by said stop means or freely receded position on said rails away from said stop means, said carriage having longitudinal track means, a step structure having opposite longitudinal sides and a transverse step tread thereon, said sides having slidable carriage track engaging means by which the step structure is adapted to collapse into or extend from said carriage, and oppositely disposed pairs of upper and lower bearings on the rearward end portion of the sides of said step structure, the members of said bearings on each of said sides being spaced apart and disposed in staggered relation to slidably engage above and below said track members and support the step structure in downward and forward slanting position, said bearing members being adapted to pivotally support and permit the step structure being folded upwardly and collapsed into said carriage or to be swung downwardly and supported in lowered and freely receded position on said carriage.

DE WITT McCANN.

REFERENCES CITED

The following references are of record in the file of this patent:

UNITED STATES PATENTS

| Number | Name | Date |
|---|---|---|
| 1,184,383 | Roebuck et al. | May 23, 1916 |
| 1,363,396 | Cross | Dec. 28, 1920 |
| 2,125,085 | Pool | July 26, 1938 |
| 2,153,945 | Thelander | Apr. 11, 1939 |
| 2,153,946 | Linstead et al. | Apr. 11, 1939 |
| 2,209,576 | McDonald | July 30, 1940 |
| 2,246,985 | Pellegrini | June 24, 1941 |